(12) United States Patent
Garg et al.

(10) Patent No.: US 7,206,322 B1
(45) Date of Patent: Apr. 17, 2007

(54) SYSTEM AND METHOD FOR USING ADSL FOR INTRODUCING MULTIPLE DERIVED LINES OVER A SINGLE LINE

(75) Inventors: Amit Garg, Howell, NJ (US); Rajeev B. Patil, Holmdel, NJ (US); Jeffrey L. Tuttle, Hazlet, NJ (US)

(73) Assignee: AT&T Corp., New York, NY (US)

( * ) Notice: Subject to any disclaimer, the term of this patent is extended or adjusted under 35 U.S.C. 154(b) by 784 days.

(21) Appl. No.: 10/096,402

(22) Filed: Mar. 11, 2002

(51) Int. Cl.
*H04J 3/16* (2006.01)

(52) U.S. Cl. .................................. 370/465

(58) Field of Classification Search ........ 370/351–354, 370/464, 465, 498, 536–538; 455/39, 500; 379/156–166, 167.01, 171–173, 242, 311–313, 379/399.01
See application file for complete search history.

(56) References Cited

U.S. PATENT DOCUMENTS

| | | | | |
|---|---|---|---|---|
| 4,444,999 A | * | 4/1984 | Sparrevohn | ................. 379/195 |
| 5,623,537 A | * | 4/1997 | Ensor et al. | ................. 379/88.2 |
| 6,118,864 A | * | 9/2000 | Chang et al. | ................. 379/225 |
| 6,181,777 B1 | * | 1/2001 | Kiko | ................. 379/32.04 |
| 6,219,411 B1 | * | 4/2001 | Peters et al. | ................. 379/177 |
| 6,272,209 B1 | * | 8/2001 | Bridger et al. | ................. 379/27.01 |
| 6,324,167 B1 | * | 11/2001 | Starr | ................. 370/250 |
| 6,526,581 B1 | * | 2/2003 | Edson | ................. 725/74 |
| 6,546,098 B1 | * | 4/2003 | Henderson | ................. 379/397 |
| 6,785,296 B1 | * | 8/2004 | Bell | ................. 370/468 |
| 6,853,725 B2 | * | 2/2005 | Levitan | ................. 379/393 |
| 2003/0043996 A1 | * | 3/2003 | Sedio et al. | ................. 379/390.02 |

OTHER PUBLICATIONS

U.S. Appl. No. 09/001,417, filed Dec. 31, 1997 to Gerszberg et al.
U.S. Appl. No. 09/576,666, filed May 23, 2000 to Gilboy et al.

* cited by examiner

*Primary Examiner*—Dmitry Levitan
(74) *Attorney, Agent, or Firm*—Banner & Witcoff, Ltd.

(57) ABSTRACT

A system and method for providing a plurality of voice and data communication lines using an ADSL local loop communication line over existing premises wire comprising a network interface device (NID), the NID receiving the ADSL local loop communication line from an ADSL service provider and a hub, the hub connected to and in communication with the NID, wherein at least one advanced customer premises equipment (CPE) device is connected to a telephone jack and in communication with the hub is described.

34 Claims, 4 Drawing Sheets

SYSTEM AND METHOD FOR USING ADSL FOR INTRODUCING MULTIPLE DERIVED LINES OVER A SINGLE LINE

FIELD OF THE INVENTION

The present invention relates to the field of communications and, in particular, to a system and method to support multiple derived communication lines using asymmetric digital subscriber line (ADSL) over existing telephone wire in the house. The multiple derived lines can be introduced without any additional wiring or re-wiring of the premises and the lines may be simultaneously used for voice (telephones) and data (PCs, laptops, etc.).

BACKGROUND OF THE INVENTION

Current ADSL technology for use in premises, for example a residence, allows a customer to use a conventional telephone for baseband voice and uses an Integrated Access Device (IAD) to introduce a single data line and multiple derived voice lines. The multiple derived lines are used for conventional telephones. The current technology, however, requires re-wiring of premises, for example, a residence, in order to support the multiple derived lines. For example, in a residence with line 1 in Room A and line 2 in Room B, there is no ability to receive telephone calls on line 2 in Room A or vice versa. Further, the current technology limits the use for high-speed data to a single line. The current state of the technology is such that a subscriber is unable to switch a line (baseband or derived voice) used for a particular device without physically re-connecting the particular device to another line.

U.S. patent application Ser. No. 09/576,466, now U.S. Pat. No. 6,400,814 entitled "Method And Apparatus For Subscriber Line To Telephone Call Distribution" by Christopher P. Gilboy and Robert Bergman Levy (hereinafter "Gilboy") was filed on May 23, 2000 and in that application two embodiments are described. In the first embodiment, all telephones on a premises line work as extensions to that line. Thus, if one telephone on a premises line is off-hook, other phones on the same premises line cannot receive/place calls. In the second embodiment, each telephone is considered unique. That is, no telephone is considered as an extension of another telephone thus preventing more than one household member from conversing with the party at the other end (e.g., mom, dad and son on a call with an away-from-home daughter). Further, Gilboy does not support using a regular telephone as a multi-line telephone. Thus, if a user is on a call on line one and another call comes on line two, the user needs to run over to another telephone connected to line two in order to answer the incoming call. The above application does not support a home data network or intercom functionality.

U.S. Pat. No. 6,324,167 entitled "Method and System for Conveying Multiple Calls on a Single Telephone Line" by Starr, filed Feb. 23, 1999 describes a method supporting multiple calls on a single twisted pair. That is, a means to provide derived lines using ADSL is described.

U.S. patent application Ser. No. 09/001,417 filed Dec. 31, 1997 now U.S. Pat. No. 6,424,646 describes a network solution for an ADSL service provider using an ISD (similar to an IAD used in generic ADSL architecture). In contrast, the present invention focuses on customer premises and provides a means to support multiple telephone lines in a house wired for a single phone without the need for rewiring.

SUMMARY OF THE INVENTION

The system and method of the present invention overcomes the above limitations of known prior art as well as providing additional benefits. The present invention uses a hub to tie multiple telephone wires within a customer premises to the same local loop, which enables the same signal (on the local loop) to be available at every telephone outlet in the residence. A router, as will be described below, may be integrated with the hub or may be stand-alone. Additionally, a network interface device (NID) is required but the NID, as well as the hub, may be provided by (e.g., leased from) the ADSL service provider.

The present invention describes using a new hardware "CPE" to assign a line to a telephone. The same line (baseband or derived voice) can be assigned to multiple phones. Moreover, telephones on the same premises wire can be assigned to different lines (baseband or derived voice). The CPE of the present invention also informs the user of the status of all lines and enables the user to select a line (baseband or derived). The present invention allows the user to select a line in-use—such a selection would result in the telephone working as an extension to another telephone using the same line (baseband or derived). The present invention also enables each single line telephone set to work as a true multi-line telephone with the capability to place a call on hold and place/receive calls on multiple lines. If a call comes in while the phone is off-hook (i.e., in use), the CPE of the present invention informs the user of an incoming call via an audio/visual alert. The user can choose to press a button on the CPE to answer the incoming call and place the original call on hold. Further, the present invention enables each telephone outlet in the house to also support a data port and enables a home network using existing telephone wire. Thus avoiding costly home re-wiring. The CPE of the present invention further adds intercom functionality to all phone sets equipped with the CPE. Only a "CPE interface unit" is required to be proximate to the end device in the present invention. No "Network Interface Unit" need be located proximate to the end device as in Gilboy. In further contrast to Gilboy, the present invention describes using a new hardware "HUB" to tie multiple premises wires together. The hub, a simpler and cheaper solution, enables all telephones on all premises wires to receive/place calls using any of the lines (baseband or derived).

The advanced CPE device of the present invention provides significant service enhancements and benefits for a multiple-line residence. These benefits include the ability to enhance every telephone in the residence to provide advanced telephone features, the ability to use each telephone as a multi-line telephone and the ability to have intercom functionality among the telephones in the residence.

Upgrading will enable a subscriber to receive advanced features such as multi-line capacity, line-in-use indicators, caller ID display and voice mail message waiting indicator. The multi-line capacity feature makes each telephone into a multi-line telephone with access to all lines.

The ability to use all lines from a single telephone is particularly useful. For example, when there is an incoming call on line 2 (only wired for upstairs) while the subscriber is on line 1 on a downstairs telephone, with the current state of the art the subscriber cannot answer the call on line 2 using the telephone on line 1. Using the advanced CPE device of the present invention, the subscriber can answer the incoming call on line 2 using the downstairs telephone wired on line 1.

The intercom feature is particularly useful, for example, when a subscriber answers a call on line 1 and determines that the call is for another member of the household. Upon determining that the call is for another member of the household, the subscriber can place the call on hold and initiate an intercom call. The other member of the household responds to the intercom by selecting the intercom key on the nearest advanced CPE device. The particular person is informed of the incoming telephone call on line 1 and answers the call on line 1. The household member, who originally answered the call, learns that the call is being answered by another household member and goes back on-hook.

The present invention also provides increased usability of the data features available with the introduction of ADSL, and thereby significantly advances the art of home networking. The present invention provides the ability to utilize multiple IP devices (computers, printers, IP appliances, etc.) without the need for advanced technical knowledge on the part of the customer/consumer. Specifically, through its available data port on every device, the present invention provides easy relocation of IP devices within the home, the concurrent use of telephone access and data access on a single advanced CPE device, an effective networking capability (LAN) within the home, and an effective routing capability within the home, whereby a multiple computer household needs only a single IP address, i.e., a single ISP account.

Currently High Speed Data (Internet) access is limited to the location that is wired to provide that access. Using the present invention, the High Speed Data (Internet) can be accessed from any home location that has an advanced CPE device.

Using the present invention, a telephone and a computer may both be attached to a single advanced CPE device on a line. Both the telephone and the Internet access can occur in parallel.

Effective LAN networking capability in a home with multiple computers and printers is essential. Using the present invention along with existing LAN technology, a computer in a downstairs location can print to a printer in an upstairs location or access the hard drive of the upstairs computer.

In summary the present invention that includes a hub and an advanced CPE device provides an ADSL subscriber with the following features and benefits:

To subscribe to multiple lines in a house wired for a single phone line.

To have ALL the telephone numbers and data available on every end point in a residence wired for multiple lines.

To enable use of existing telephone wire in the residence for a LAN without the need to rewire.

To allow a line number to be assigned to a telephone without need to rewire.

To enable every single line telephone in the residence to be used as a multi-line telephone.

To support intercom functionality between telephones in a household.

The present invention will allow an ADSL provider to offer advanced features and use the present invention to distinguish and discriminate ADSL service over conventional plain old telephone service (POTS).

It is, therefore, an object of the present invention to provide increased usability of the multiple lines that become available when ADSL is introduced into a residence.

It is a further object of the present invention to provide increased usability of the data features available when ADSL is introduced into a residence, thereby significantly advancing the art of home networking.

BRIEF DESCRIPTION OF THE DRAWINGS

The invention is best described with reference to the detailed description and the following figures, where.

DETAILED DESCRIPTION OF THE PREFERRED CONFIGURATIONS

The present invention comprises a hub and an advanced CPE device. The hub is required in a residence wired for multiple telephone lines and is used to tie multiple telephone wires to the same local loop. This enables the same signal (on the local loop) to be available at every telephone outlet in the residence. In another embodiment the HUB is either used in conjunction with a router or has built-in router functionality. This facilitates setting up a LAN in the residence using a single IP address from the Internet service provider (ISP).

The advanced CPE device will need to be installed between the end device (telephone, fax, LAN card, etc.) and the telephone jack. The telephone jack is not shown on the figures but is between the hub and the advanced CPE device. The telephone jack is usually proximate to the advanced CPE device. The advanced CPE device functionality can also be built into the telephone sets. Integrating the advanced CPE device into the telephone will be extremely beneficial for cordless telephones. Two configurations for the advanced CPE device of the present invention as depicted in FIGS. 3 and 4 are discussed and described below.

Figure 1:
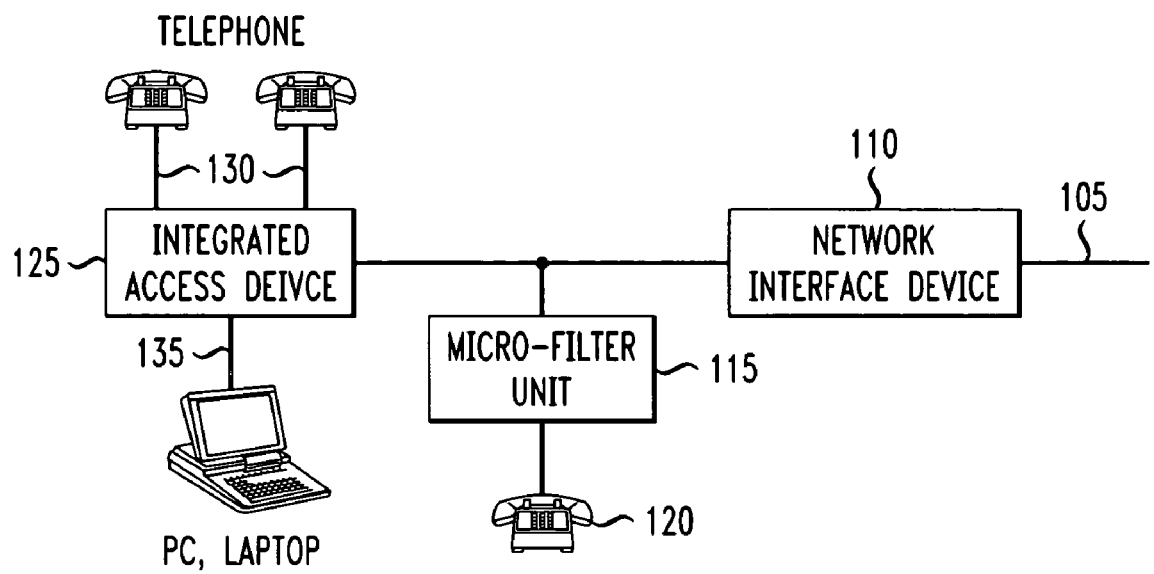
FIG. 1 depicts the use of an ADSL line as is currently known in the art.

FIG. 1 depicts the use of an ADSL line as is currently known in the art. The telephone line 105 entering the residence is directed to a network interface device (NID) 110. A single micro-filter unit 115 separates (usually by means of a filter) the baseband signal for forwarding to a baseband telephone 120. The incoming signal is also directed to an Integrated Access Device (IAD) 125, which provides multiple derived lines 130 for use with telephones and a single high-speed data line 135 for use with, for example, a PC, a laptop, etc. The disadvantages of this technology were highlighted above.

Figure 2:
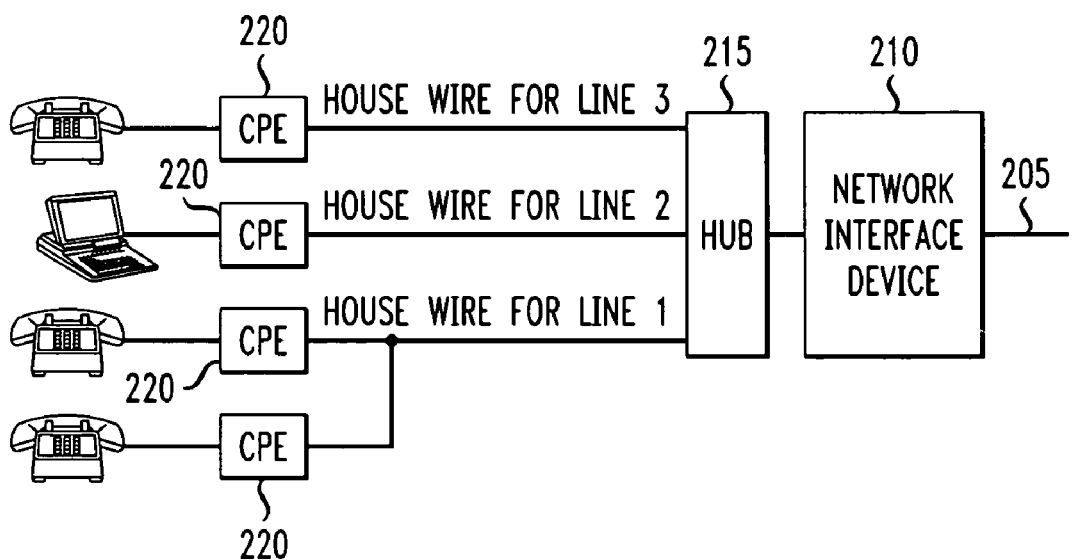
FIG. 2 shows an exemplary configuration of the present invention using a hub and a plurality of advanced CPE units.

FIG. 2 shows an exemplary configuration of the present invention using a hub and a plurality of advanced CPE units. A local loop telephone line 205 is directed to a NID 210. The hub 215 is used to tie multiple phone lines to the same local loop without signal degradation. Using the same local loop enables the same signal (on the local loop) to be available at every telephone outlet in the residence. The hub 215 is required in a residence wired for multiple telephone lines. Advanced CPE unit 220 will be interposed between each device and the hub. Telephones for line 1, a telephone for line 3 and a laptop for line 2 are shown. As will become apparent from the description provided hereinafter the advantages of the present invention are:
1. The house need not be wired for multiple telephone lines to be able to subscribe to multiple communication lines.
2. Every telephone in the residence can be used on any communication line by pressing a key on an advanced CPE.
3. Every telephone extension in the residence can be used as a high-speed data port.
4. The existing telephone wire in the residence can be used to support a Local Area Network (LAN)—that is, with IP addresses assigned by an Internet Service Provider (ISP).

Figure 3:
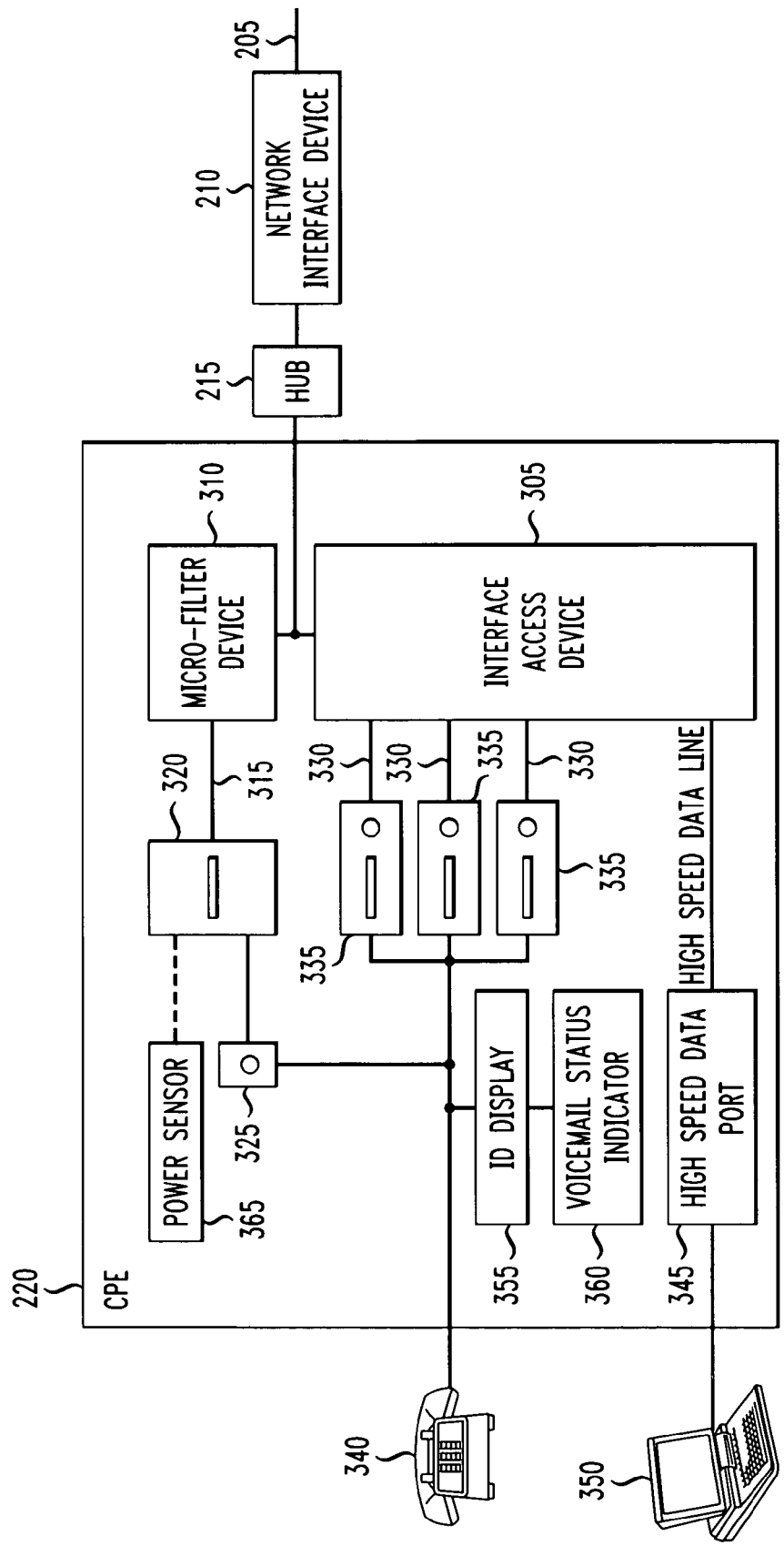
FIG. 3 shows a first exemplary embodiment of an advanced CPE unit.
Figure 4:
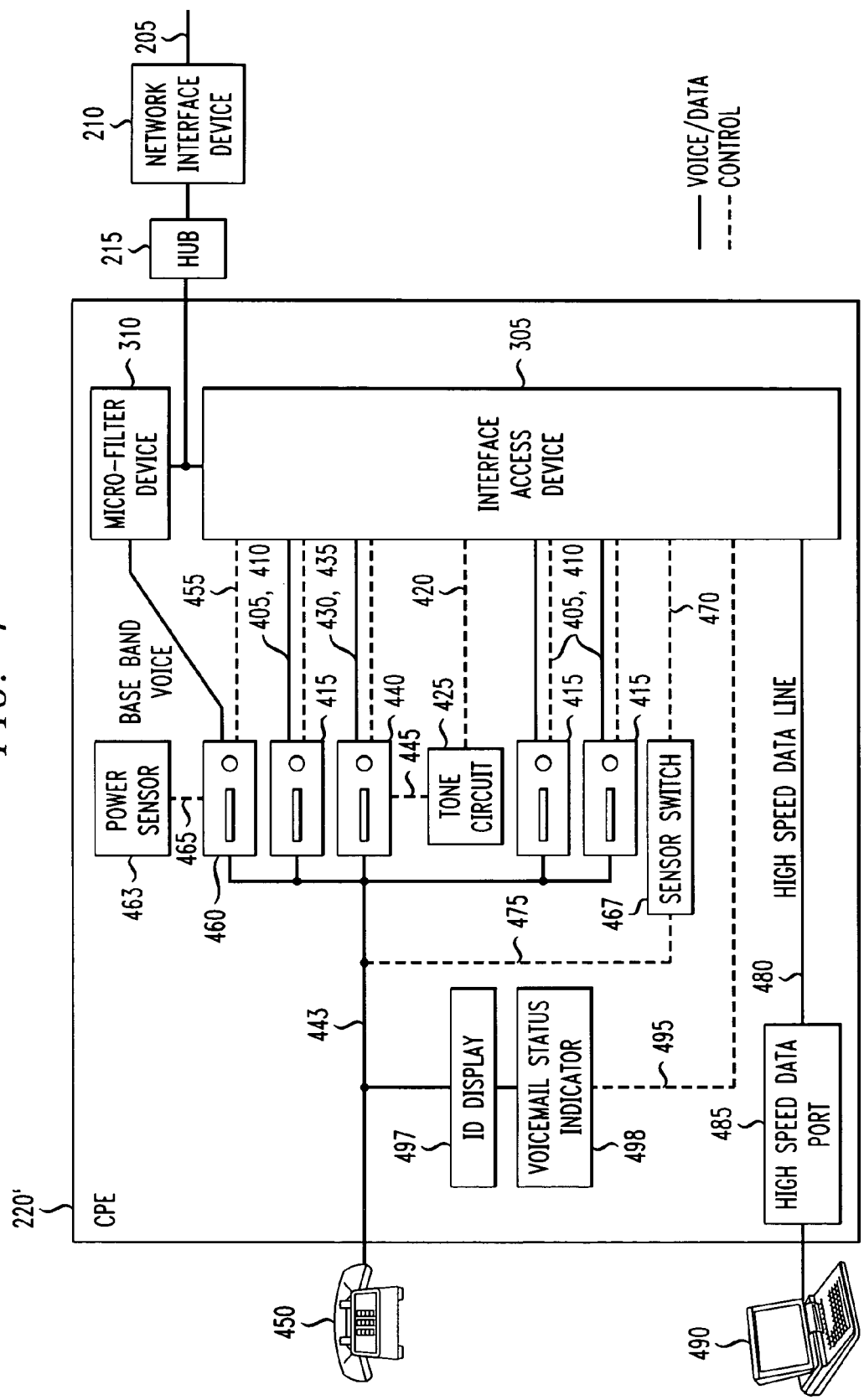
FIG. 4 is a second exemplary embodiment of an advanced CPE unit/device of the present invention.

FIG. 3 shows a first exemplary embodiment of an advanced CPE unit. As described previously the local loop telephone line 205 is directed to the NID 210. The advanced CPE unit 220 of the present invention includes an interface access device (IAD) 305 and a micro-filter (MF) device 310. The MF device 310 separates (usually by a filter) a baseband line 315 for voice. The baseband line 315 is directed to an auto baseband R-switch 320, which uses a display LED 325 indicating whether or not the baseband communication line is being used. The IAD 305 derives multiple communication lines, herein depicted as three derived lines 330, each of which is directed to a line selector switch and LED status display 335. A telephone 340 can use the baseband communication line 315 or any of the derived lines 330 by depressing a key on an advanced CPE unit. The LED displays 325, 335 will indicate the communication line 315, 330 selected for the end device (i.e, telephone, PC, laptop, etc.). The IAD also supports an always ON high speed data port 345 connected to a digital end device 350 such as a PC, a laptop etc. The advanced CPE unit also has a power sensor 365. Also available as an option on an advanced CPE unit are a caller ID display 355 and a voicemail status indicator 360.

The line selector switches 335 of the present invention are "press on"/"press off" to select a communication line. By default, the end device (telephone) will always be on the baseband line 315. A subscriber will, however, be able to select using a baseband line 315 for the end device by switching off all of the derived lines 330. A subscriber will be able to switch the end device to a derived communication line 330 by depressing the appropriate one of communication line selector switches 335. Switching on a derived communication line 330 will automatically turn the auto baseband R-switch 320 off. The optional power sensor 365 will automatically switch voice communications to the baseband line 315 in the event of a power failure.

If the baseband line is selected, a telephone will operate on the baseband line 315 and the corresponding LED 325 indicates the selected communication line with a high-speed data port available for use in parallel with the baseband line. If a derived line 330 is selected, then the auto baseband R-switch 320 automatically cuts off the baseband line 315 to a telephone and the corresponding LED indicates the selected communication line with a high-speed data port available for use in parallel with the selected derived line. Power failure can be used as a trigger to toggle the telephone line to the baseband line. In the alternative, a subscriber can press the derived line switch 335 to switch off the derived line, which will toggle the auto baseband R-switch 320 to switch the telephone to the baseband line 315. In summary, if the baseband line 315 is in use then the advanced CPE unit will function as a micro filter, and if a derived line 330 is in use, then the advanced CPE unit will function like an IAD for the derived line. In this alternative, the advanced CPE device supports static line assignment to an end device.

FIG. 4 is a second exemplary embodiment of an advanced CPE unit/device 220' of the present invention. Like reference numbers have been used to reference like elements. A local loop telephone line 205 is directed to a NID 210. The hub 215 is used to tie multiple telephone lines to the same local loop without signal degradation. The advanced CPE unit 220 of the present invention includes an IAD 305 and a MF device 310. The second exemplary configuration of an advanced CPE unit 220' has both voice lines and control lines within the advanced CPE unit. Each derived line consists of a voice line 405 and a control line 410 pair. The derived line pairs are each directed from the IAD 305 to a line selector switch and LED display 415. A voice line exits from the plurality of line selector switches and LED displays 415 and is directed to an end device (i.e., telephone) 450. A first tone circuit control line 420 exits the IAD 305 and is directed to a tone circuit 425. An intercom communication control line 430 and intercom communication voice line 435 from the IAD 305 enters an intercom LED display 440. A second tone circuit control line 445 from the tone circuit 425 enters the intercom LED display 440. A voice/data line 443 exits the intercom unit with a LED display 440 and is directed to an end device 450. A line selector switch with a R-switch 460 is connected to the baseband voice line from the MF device 310 and is connected to the IAD 305 via a control line 455. Line switch selector with R-switch 460 is connected to a power sensor 463 via a power sensor control line 465. The IAD 305 is further connected to an on/off hook sensor switch 467 via an on/off hook sensor control line 470. The on/off hook sensor switch 467 is connected to an end device 450 via a second on/off hook sensor control line 475. A high-speed data line 480 is directed from the IAD 305 to a high-speed data port 485, which supports a digital device 490 (PC, laptop, etc.) in parallel with the derived lines 405, 410 and the baseband voice line. A voice mail message waiting status indicator control line 495 exits the IAD 305 and is directed to optional available circuits for a caller ID display 497 and a voice mail status indicator 498.

In the second exemplary embodiment of the present invention, the data port is always on and each telephone operates as a multi-line telephone. Whenever the end device (telephone) is idle or on-hook, the advanced CPE device 220' of the present invention illustrated in FIG. 4 may turn the R-switch 460 "on". That is, by default the end device will communicate on the baseband line. If the end device is on-hook, then an incoming baseband call will function as usual. That is, the end device will ring and communicate on the baseband line. If the end device is off-hook due to its use by a derived line, the IAD detects the off-hook condition and will generate an audio alert using the tone generator and cause the status LED to blink with the R-switch (audio-visual notification). The subscriber will be able to press the baseband line selector switch to answer the incoming baseband telephone call and place the original telephone call on the derived line on hold. Outgoing or outbound telephone calls will always use the baseband line as the default line. The subscriber will be able to select a derived line for an outbound telephone call using the corresponding line selector switches.

The IAD may detect when a telephone using the baseband line is off-hook using the on/off-hook sensor circuit and/or the status from the R-switch. The IAD may detect when a telephone using a derived line is off-hook using the on/off-hook sensor circuit and/or the status from the derived line selector switch. The IAD may determine whether a telephone on a derived line is in use. If the telephone on a derived line is on-hook, the IAD turns off the R-switch and turns on the corresponding derived line selector switch to the end device and the call is established (including ringing) using the derived line. If the telephone on a derived line is off-hook, the IAD generates an audio alert using the tone generator and causes the corresponding derived line LED status light to blink. The subscriber is able to press the line selector switch to answer the telephone call and place the original call on hold.

When using the advanced CPE device 220' as an intercom, the IAD supports an intercom line using an internal IP address. The subscriber is able to select the intercom line by pressing the corresponding switch. If the intercom line is not in use, selecting the intercom line results in an alert tone/visual indicator on all other advanced CPE devices 220' (not shown). The alert stops once another intercom line is selected or if there are no active intercom lines. If the intercom line is in use, selecting the intercom line on another advanced CPE device (not shown) works in a manner similar to a subscriber picking up another extension on a telephone line.

The status LED lights indicate the status of the various telephone lines. If an LED status light is constantly on/lit, then the corresponding line is in use. If an LED status light is blinking, then the corresponding line is either on hold or has an incoming call. If an LED status light is off/not lit, then the corresponding line is idle. A subscriber may place a call on hold and place another outgoing telephone call using an idle line. When a line is in use, all advanced CPE devices in the residence will show that the line is in use by the corresponding LED status light remaining lit until the call is terminated or placed on hold. An optional power sensor automatically switches the advanced CPE device to the baseband line in case of a power failure. The LED status light/display indicates the active line (the line selected for use by the corresponding end device). Caller ID, message waiting indicator and other features are available on a per-line or an integrated basis.

Figure 5:
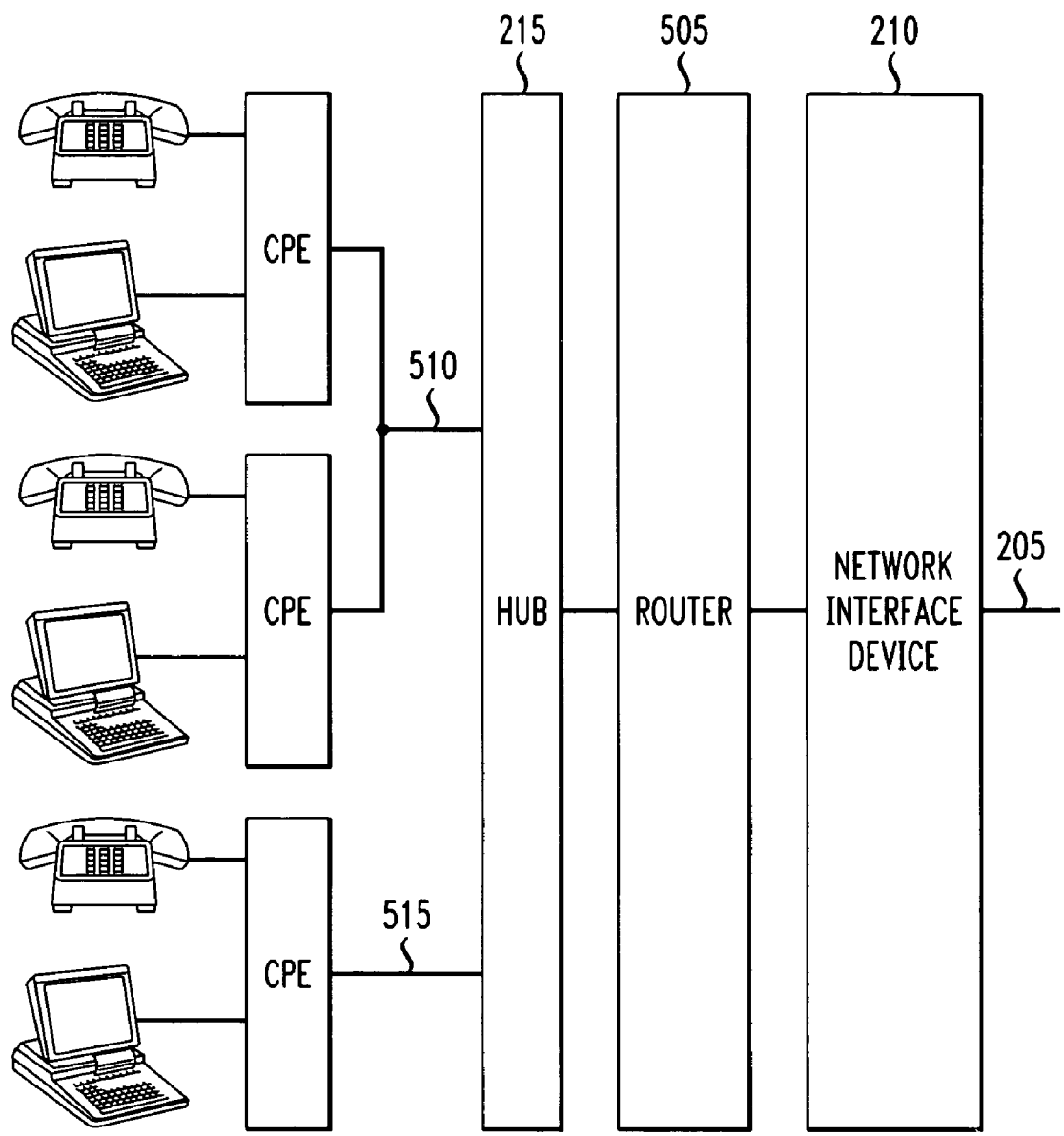
FIG. 5 is a second exemplary configuration using either the first exemplary embodiment of an advanced CPE device or the second exemplary embodiment of an advanced CPE unit.

FIG. 5 is a second exemplary configuration using either the first exemplary embodiment of an advanced CPE device 220 of FIG. 3 or the second exemplary embodiment of an advanced CPE unit 220' of FIG. 4. A local loop telephone line 205 is directed to a NID 210 and thereafter to a hub 215 via a router 505. Two lines exit hub 215. The first line 510 is directed to a pair of advanced CPE devices such as are described in the first and second embodiments of the present invention. The second line 515 is directed to an advanced CPE device such as are described in the first and second embodiments of the present invention. In each case the advanced CPE device has parallel voice and data lines directed to end devices (telephone or PC/laptops, etc.). This second configuration, which has a router interposed between the NID and the hub, facilitates setting up a local area network (LAN) in the residence using a single ISP address from the Internet service provider (ISP). The router can physically be in the same box as the hub. That is, the router can be integrated with the hub. Using a router can also facilitate adding features to the advanced CPE device, such as supporting the use of telephones as intercoms using a special key to "alert" messages between IADs and the use of tone generators.

The present invention can be applied in such a way so as to provide multiple clusters of telephone numbers in a house wired for multiple lines. For example, house wires for line 1 and line 2 can have telephone numbers A, B, C for phone and fax whereas house wire for line 3 can have phones D, E and F for telephone and fax.

It should be clear from the foregoing that the objectives of the invention have been met. While particular configurations of the present invention have been described and illustrated, it should be noted that the invention is not limited thereto since modifications may be made by persons skilled in the art. The present application contemplates any and all modifications within the spirit and scope of the underlying invention disclosed and claimed herein.

What is claimed is:

1. A system for providing a plurality of voice and data communication lines using an asymmetric digital subscribed line (ADSL) local loop communication line over existing premises wire, comprising:
   a network interface device (NID), said NID receiving said ADSL local loop communication line from an ADSL service provider;
   a hub, said hub operatively connected to and in communication with said NID; and
   at least one advanced customer premises equipment (CPE) device, said at least one CPE device operatively connected to a telephone jack and in communication with said hub, said at least one CPE device including:
      an interface access device (IAD) operatively connected to and in communication with said hub;
      a micro-filter (MF) device for separating a baseband communication line, said MF device operatively connected to and in communication with said hub;
      an R-switch operatively connected to and in communication with said MF device;
   wherein said hub ties together multiple telephone wires within a customer's premises to said ADSL local loop and
   wherein said at least one advanced CPE device further comprises:
   said IAD deriving a plurality of derived communication lines from the ADSL local loop for use as voice lines with a telephone, said IAD further deriving a high speed data line for use with a digital end device via a data port;
   said baseband communication line for use as a voice line with a telephone;
   said R-switch being an auto baseband R-switch;
   a status LED light operatively connected to and in communication with said auto-baseband R-switch, said status LED indicating whether said baseband communication line is in use; and
   a plurality of line selector switches and status LED display in combination operatively connected to and in communication with said IAD via plurality of derived communications lines, said plurality of line selector switches and status LED displays in combination and said status LED operatively connected to and in communication with a telephone.

2. The system according to claim 1, further comprising a power sensor for switching said telephone to said baseband communication line in an event of a power failure.

3. The system according to claim 1, further comprising;
   a voice mail message waiting status indicator; and
   a caller ID display, said caller ID display operatively connected to and in communication with said voice mail message waiting status indicator, said caller ID display further operatively connected to and in communication with said telephone.

4. The system according to claim 1, wherein said at least one advanced CPE device further comprises:
   said IAD creating a plurality of derived communication lines for use as voice lines with a telephone, said IAD further creating a high speed data line for use with a digital end device via a data port, said IAD further creating a plurality of control lines, one control line for each of said derived communication lines;

said baseband communication line for use as a voice line with a telephone, one of said control lines created by said IAD for said baseband communication line;

a plurality of line selector switch and status LED display combinations, each line selector switch and LED status display combination operatively connected to and in communication with one of said plurality of control lines and one of said plurality of derived communication lines, each of said plurality of line selector switch and status LED display combinations operatively connected to and in communication with said telephone;

said R-switch being a line selector R-switch, said line selector R-switch and status LED display combination operatively connected to one of said plurality of control lines and said baseband communication line, said line selector R-switch and status LED display combination operatively connected to and in communication with said telephone;

a tone circuit operatively connected to and in communication with said IAD via a first tone circuit control line;

an intercom switch and LED display, said intercom switch and LED display operatively connected to and in communication with said IAD via a voice line and an intercom control line, said intercom switch and LED display operatively connected to and in communication with said tone circuit via a second tone circuit control line, said intercom switch and LED display further operatively connected to and in communication with said telephone; and an on/off hook sensor circuit operatively connected to and in communication with said IAD via a first on/off hook sensor control line, said on/off hook sensor circuit operatively connected to and in communication with said telephone via a second on/off hook sensor control line.

5. The system according to claim 4, further comprising a power sensor for switching said telephone to said baseband communication line in an event of a power failure, said power sensor operatively connected to and in communication with said line selector R-switch and status LED display combination via a power sensor control line.

6. The system according to claim 4, further comprising;
a voice mail message waiting status indicator, said voice mail message waiting status indicator operatively connected to and in communication with said IAD via a voice mail message waiting status indicator control line; and
a caller ID display, said caller ID display operatively connected to and in communication with said voice mail message waiting status indicator, said caller ID display further operatively connected to and in communication with said telephone.

7. The system according to claim 1, wherein said at least one advanced CPE device assigns one of a baseband telephone line and a derived telephone line to a telephone.

8. The system according to claim 1, wherein said at least one advanced CPE device permits a telephone line to be assigned to multiple phones.

9. The system according to claim 1, wherein said at least one advanced CPE device permits telephones on a same telephone line to be assigned to different telephone lines, wherein said different telephone lines are one of derived telephone lines and a baseband telephone lines.

10. The system according to claim 1, wherein said at least one advanced CPE device informs a user of status of said plurality of voice and data communication lines.

11. The system according to claim 1, wherein said at least one advanced CPE device enables a user to select one of a baseband telephone line and a derived telephone line.

12. The system according to claim 1, wherein said at least one advanced CPE device allows a user to select a line in-use resulting in a telephone working as an extension to another telephone using a same line, further wherein said same line is one of a baseband telephone line and a derived telephone line.

13. The system according to claim 1, wherein said at least one advanced CPE device enables each single line telephone set with a capability to place a call on hold and place and receive calls on multiple lines.

14. The system according to claim 1, wherein said at least one advanced CPE device informs a user of an incoming telephone call via an audio-visual alert if said telephone call comes in while a telephone is off-hook.

15. The system according to claim 1, wherein said at least one advanced CPE device enables each telephone outlet in a customer's premises to support a data port and enables a home network using existing telephone wire.

16. The system according to claim 1, wherein said at least one advanced CPE device adds intercom functionality to all telephones operatively connected to and in communication with said at least one advanced the CPE device.

17. A system for providing a plurality of voice and data communication lines using an asymmetric digital subscriber line (ADSL) local loop communication line, comprising:
a network interface device (NID), said NID receiving said ADSL local loop communication line from an ADSL service provider;
a router, said router operatively connected to and in communication with said NID, said router for facilitating setting up a private local area network (LAN); and
a hub, said hub operatively connected to and in communication with said router, wherein
at least one advanced customer premises equipment (CPE) device is operatively connected to and in communication with said hub, the at least one CPE device including:
an interface access device (IAD) operatively connected to and in communication with said hub, said IAD deriving a plurality of derived communication lines for use as voice lines with a telephone, said IAD further creating a high speed data line for use with a digital end device via a data port;
a micro-filter (MF) device for separating a baseband communication line, said MF device connected to and in communication with said hub, said baseband communication line for use as a voice line with a telephone; and
an R-switch operatively connected to and in communication with said MF device.

18. The system according to claim 17, wherein said at least one advanced CPE device further comprises:
said R-switch being an auto baseband R-switch;
a status LED operatively connected to and in communication with said auto baseband R-switch, said status LED indicating whether said baseband communication line is in use; and
a plurality of line selector switches and status LED displays in combination operatively connected to and in communication with said IAD via said plurality of derived communication lines, said plurality of line selector switches and status LED displays in combination and said status LED operatively connected to and in communication with a telephone.

19. The system according to claim 18, further comprising a power sensor for switching said telephone to said baseband communication line in an event of a power failure.

20. The system according to claim 18, further comprising;
a voice mail message waiting status indicator; and
a caller ID display, said caller ID display operatively connected to and in communication with said voice mail message waiting status indicator, said caller ID display further operatively connected to and in communication with said telephone.

21. The system according to claim 17, wherein said at least one advanced CPE device further comprises:
said IAD further creating a plurality of control lines, one control line for each of said derived communication lines;
one of said control lines created by said IAD being for said baseband communication line;
a plurality of line selector switch and status LED display combinations, each line selector switch and LED status display combination operatively connected to and in communication with one of said plurality of control lines and one of said plurality of derived communication lines, each of said plurality of line selector switch and status LED display combinations operatively connected to and in communication with said telephone;
a line selector R-switch and status LED display combination operatively connected to one of said plurality of control lines and said baseband communication line, said line selector R-switch and status LED display combination operatively connected to and in communication with said telephone;
a tone circuit operatively connected to and in communication with said IAD via a first tone circuit control line;
an intercom switch and LED display, said intercom switch and LED display operatively connected to and in communication with said IAD via a voice line and an intercom control line, said intercom switch and LED display operatively connected to and in communication with said tone circuit via a second tone circuit control line, said intercom switch further operatively connected to and in communication with said telephone; and
an on/off hook sensor circuit operatively connected to and in communication with said IAD via a first on/off hook sensor control line, said on/off hook sensor circuit operatively connected to and in communication with said telephone via a second on/off hook sensor control line.

22. The system according to claim 21, further comprising a power sensor for switching said telephone to said baseband communication line in an event of a power failure, said power sensor operatively connected to and in communication with said line selector R-switch and status LED combination via a power sensor control line.

23. The system according to claim 21, further comprising;
a voice mail message waiting status indicator, said voice mail message waiting status indicator operatively connected to and in communication with said IAD via a voice mail message waiting status indicator control line; and
a caller ID display, said caller ID display operatively connected to and in communication with said voice mail message waiting status indicator, said caller ID display further operatively connected to and in communication with said telephone.

24. The system according to claim 7, wherein said router and said hub are integral.

25. A method for operating a system for providing a plurality of voice and data communication lines using an ADSL local loop communication line, comprising:
receiving at a network interface device (NID) signals on an ADSL local loop communication line;
forwarding said signals on said ADSL local loop communication line to a hub;
directing said signals to both a micro-filter (MF) device and an interface access device (IAD);
separating by said MF device a baseband communication line for use as a voice line with a telephone;
receiving, by an auto baseband R-switch, baseband signals on said baseband communication line;
lighting a status LED if said baseband communication line is in use;
forwarding said baseband signals to said telephone;
deriving, by said IAD, a plurality of derived communication lines and a high-speed data line;
forwarding high speed digital signals to a digital end device via a data port;
forwarding derived communication line signals over said plurality of derived communication lines to a plurality of line selector switch and status LED display combinations, said status LED displays being lit if the derived communication line connected to said line selector switch and status LED display combination is in use; and
forwarding said derived communication line signals to said telephone.

26. The method according to claim 25, further comprising:
sensing, by a power sensor, a power failure; and
automatically switching said telephone to said baseband communication line.

27. The method according to claim 25, further comprising notifying a subscriber that at least one voice mail message is waiting to be retrieved.

28. The method according to claim 25, further comprising displaying a caller's ID upon receipt of an incoming call.

29. The method according to claim 25, further comprising:
sensing, by a power sensor, a power failure; and
automatically switching said telephone to said baseband communication line.

30. The method according to claim 25, further comprising notifying a subscriber that at least one voice mail message is waiting to be retrieved.

31. The method according to claim 25, further comprising displaying a caller's ID upon receipt of an incoming call.

32. A method for operating a system for providing a plurality of voice and data communication lines using an ADSL local loop communication line comprising:
receiving at a network interface device (NID) signals on an ADSL local loop communication line;
forwarding said signals on said ADSL local loop communication line to a router;
forwarding said signals on said ADSL local loop communication line to a hub;
directing said signals to both a micro-filter (MF) device and an interface access device (IAD);
separating by said MF device a baseband communication line for use as a voice line with a telephone;

receiving, by an auto baseband R-switch, baseband signals on said baseband communication line;
lighting a status LED if said baseband communication line is in use;
forwarding said baseband signals to said telephone;
deriving, by said IAD, a plurality of derived communication lines and a high-speed data line;
forwarding high speed digital signals to a digital end device via a data port;
forwarding derived communication line signals over said plurality of derived communication lines to a plurality of line selector switch and status LED display combinations, said status LED displays being lit if the derived communication line connected to said line selector switch and status LED display combination is in use; and
forwarding said derived communication line signals to said telephone.

33. A method for operating a system for providing a plurality of voice and data communication lines using an asymmetric digital subscriber line (ADSL) local loop communication line over existing premises wire, comprising:
receiving at a network interface device (NID) signals on said ADSL local loop communication line;
forwarding said signals on said ADSL local loop communication line to a hub;
directing said signals to both a micro-filter (MF) device and an interface access device (IAD);
separating by said MF device a baseband communication line for use as a voice line with a telephone;
receiving, by an auto baseband R-switch, baseband signals on said baseband communication line;
receiving, by said auto baseband R-switch, control signals over a baseband control line from said IAD;
lighting a status LED if said baseband communication line is in use;
forwarding said baseband signals to said telephone;
deriving, by said IAD, a plurality of derived communication lines and a high-speed data line;
forwarding high speed digital signals to a digital end device via a data port;
forwarding derived communication line signals over said plurality of derived communication lines to a plurality of line selector switch and status LED display combinations, said status LED displays being lit if the derived communication line connected to said line selector switch and status LED display combination is in use;
forwarding derive communication line control signals over a plurality of derived communication control lines to said plurality of line selector switch and status LED display combinations;
forwarding said derived communication line signals to said telephone;
forwarding intercom communication signals over an intercom communication voice line to an intercom switch and LED display;
forwarding intercom control signals to said intercom switch and LED display via an intercom communications control line;
forwarding tone circuit signals by said IAD to a tone circuit via a first tone circuit control line;
forwarding tone circuit signals over a second tone circuit control line to said intercom switch and LED display;
forwarding said intercom communication signals to said telephone;
forwarding control signals to an on/off hook sensor circuit via a first on/off hook sensor circuit control line by said IAD; and
forwarding output of said on/off hook sensor circuit to said telephone via a second on/off hook control line.

34. A method for operating a system for providing a plurality of voice and data communication lines using an asymmetric digital subscriber line (ADSL) local loop communication line over existing premises wire, comprising:
receiving by a network interface device (NID) signals on said ADSL local loop communication line;
forwarding said signals on said ADSL local loop communication line to a router by said NID;
forwarding said signals on said ADSL local loop communication line to a hub by said router;
directing said signals to both a micro-filter (MF) device and an interface access device (IAD);
separating by said MF device a baseband communication line for use as a voice line with a telephone;
receiving, by an auto baseband R-switch, baseband signals on said baseband communication line;
receiving, by said auto baseband R-switch, control signals over a baseband control line from said IAD;
lighting a status LED if said baseband communication line is in use;
forwarding said baseband signals to said telephone;
deriving, by said IAD, a plurality of derived communication lines and a high-speed data line;
forwarding high speed digital signals to a digital end device via a data port;
forwarding derived communication line signals over said plurality of derived communication lines to a plurality of line selector switch and status LED display combinations, said status LED displays being lit if the derived communication line connected to said line selector switch and status LED display combination is in use;
forwarding derived communication line control signals over a plurality of derived communication control lines to said plurality of line selector switch and status LED display combinations;
forwarding said derived communication line signals to said telephone;
forwarding intercom communication signals over an intercom communication voice line to an intercom switch and LED display;
forwarding intercom control signals to said intercom switch and LED display via an intercom communications control line;
forwarding tone circuit signals by said IAD to a tone circuit via a first tone circuit control line;
forwarding tone circuit signals over a second tone circuit control line to said intercom unit and LED display;
forwarding said intercom communication signals to said telephone;
forwarding control signals to an on/off hook sensor circuit via a first on/off hook sensor circuit control line by said IAD; and
forwarding output of said on/off hook sensor circuit to said telephone via a second on/off hook control line.

* * * * *